July 30, 1963  H. J. BRYAN  3,099,227
PIPELINE VEHICLE GOVERNING DEVICE
Filed Aug. 5, 1960  6 Sheets-Sheet 1

INVENTOR.
Harvard J. Bryan
BY
REG. PATENT AGENT

FIG. 2b

INVENTOR.
Harvard J. Bryan

INVENTOR.
Harvard J. Bryan
BY
REG. PATENT AGENT

July 30, 1963 H. J. BRYAN 3,099,227
PIPELINE VEHICLE GOVERNING DEVICE
Filed Aug. 5, 1960 6 Sheets-Sheet 6

INVENTOR.
Harvard J. Bryan
BY
REG. PATENT AGENT

United States Patent Office 3,099,227
Patented July 30, 1963

3,099,227
PIPELINE VEHICLE GOVERNING DEVICE
Harvard J. Bryan, Dallas, Tex., assignor to Harvest Queen Mill & Elevator Company, Dallas, Tex., a corporation of Texas
Filed Aug. 5, 1960, Ser. No. 47,833
7 Claims. (Cl. 104—139)

This invention relates to a speed governor adapted to travel inside cylindrical pipelines under differential pneumatic pressures, the governor being of the mechanically working and actuated type for maintaining a selectively established rate of translational movement of the apparatus.

It is frequently necessary, in the case of a pipeline being newly strung, to provide a corrosion-resistant inside surface or a surface to control paraffin accumulation. Where a pipeline already is in use, remedial and/or improvement measures such as photography by X-rays or infrared light or otherwise, for inspecting, charting, testing, indicating, recording or the like, require a system controlled in its movement through the pipeline. Such inspection may be effected magnetically, electrically, electronically, ultrasonically or otherwise, or it may consist in ordinary sonic signalling for the benefit of an observer outside the pipeline.

The pipeline may be one for the conveying of liquids or gases or of a substance in a plastic state. Such substance may enter into joint travel with a body of any appropriate gas, such as air. Where there are two cargo elements, the first is designated a carrier. The other is the cargo. The carrier may be a body of gas or a liquid, for example, water. The cargo may be a pulverulent or granular substance or one sufficiently disintegrated for suspension thereof in a carrier. If the cargo be a gas, it can, in some cases, be transported by temporarily dissolving it in a liquid carrier. If there be a container holding the cargo, the container can be of the type designed to protect the cargo against breakage or abrasion. Again, it can be of the hermetically sealing type holding, along with the cargo, a protective gas to prevent chemical change or where the cargo is an animate one, to sustain life.

This invention is applicable to either one of the two systems of utilizing pneumatic pressure for propulsion. In the first of the two systems, there is a superatmospheric pressure established only in the upstream zone, with atmospheric pressure in the downstream zone. In the second, superatmospheric pressure is maintained in both zones with the higher pressure in the upstream zone. In the case of either system, the propulsion force consists in the difference between the two pressures. The first system makes possible more economical operation, in that attending personnel and compressor equipment are necessary at only the upstream end. The first is the preferred system. It is termed a "single-superatmospheric system." The invention is applicable also to the second system termed a "double-superatmospheric system." Precision of control of the rate of translational movement of the apparatus is about the same in both systems. This constitutes the salient object and advantage of the invention.

Because of the simplicity that inherently characterizes the speed governor embodiments of this invention, other important advantages accrue to users of the embodiments. For example, there is marked economy in both the manufacturing and assembling labor cost and the cost of the materials, durability of the governor, and infrequency of occasions required to readjust for optimal performance. In other words, there is less down time.

By way of further brief description, it is pointed out that the preferred embodiment takes the form of an assembly of a wheel section and a weight section involving centrifugal weights. The two sections are rigidly bolted together. The governor is operative with either of the two sections leading the other. The mounting of the wheels is resilient with supporting springs being powerful enough to make resilient urging of the wheels onto the pipeline inside surfaces a stronger factor in their braking function than the force of gravity applied by the mass of the governor. This fact renders the position of the wheels relative to the center of mass of the governor not a deciding factor in the design. It is preferable, where no consideration operates thereagainst, that the wheels be disposed as near as posible to the center of mass so that the force of gravity bolsters the force supplied by the springs for maximal braking effect. The four wheels present in the illustrative embodiment may be replaced by two wheels. Resiliently mounted (but with quite light pressure on the inside surface of the pipeline) on the side walls of the wheel section frame are two torque rollers or stabilizing rollers. They serve the function of verticality-restoring means. They can be mounted alternatively on the side walls of the weight section, although perhaps not as advantageously for functioning. Resiliently mounted on the rear end of the weight section and extending radially outward are either three or four guiding-aligning rollers which serve as a guiding means.

The term "rollers" applies herein only to the torque rollers and to the guiding rollers.

The term "sides" is alternatively one of individual and of joint reference to the side walls of the wheel section and to the side walls of the weight section.

The expression "local association with" refers to the fact that the speed governor embodiment either is an element that is rigidly integrated with an apparatus operating inside a pipeline or is a unit of a train of which the apparatus too is a unit.

The expression "rolling means" refers to a pair or a plurality of pairs of relatively wide-tread, combined mechanical - force - generating, translational - movement-braking wheels. They symmetrically engage both the roof portion and the base portion of the pipeline inside surfaces when the governor is in normal position. Each wheel-axial plane, whether there be one or a plurality of wheels, defines at the intersection thereof with the wheel tread a circular arc which transversely corresponds with the pipeline inside cylindrical surface.

The expression "mechanical brake" as employed may be one in which there is a plurality of coaxially mounted disks or it may be one like that incorporated in the illustrative embodiment where there are a male member and a female member, the engaging surface of the one and the engaging surface of a brake lining cemented onto the other both lying in a conical surface when they are in braking relationship. The mechanical brake may be one of the hydraulic type because a hydraulic fluid, being a liquid, is a tangible element just as much as a gear is and, therefore, a mechanical element.

The expression "force-transmitting means" refers to all of the elements which operatively intervene between the rolling means and the brake. The expression "positive force" refers to a mechanical force directed from the rolling means to the brake. The same force, but in that aspect thereof when it is being momentarily returned from the brake to the rolling means, has become the reaction or reactive or reaction-braking force or the braking force; the reaction-braking force is therefore the positive force in reverse.

The term "male member and female member" may refer to a plurality of brake elements, as in the case of a brake of the disk type where there are three or more coaxially mounted disks in all, with one disk being a fixed element or stator element or stator and with two or more disks rotating and being rotating elements.

An embodiment shown in the drawings has two pairs of wheels, four said guiding rollers, and two torque rollers. The simplest embodiment would be one with a single pair of said wheels and three guiding rollers and without any torque rollers. However, the selected embodiment can properly be regarded as an adequately simple and typical one, adapted to conveniently serve for the setting of the principles of this invention. For this reason, it has been made the subject of this specification and of the accompanying drawings, in which:

FIGURE 8 is a sectional view taken in the plane 8—8 in FIGURE 2a.

The pipeline inside surface is schematically represented by the dot-and-dash lines 10.

The framing of the speed governor embodiment consists of the open frame 12A of the fore section 12. A cylindrical body 14A of the aft section 14 is bolted to the fore section. With the exception of certain ventilating holes for the cooling of the brake, body 14A is a frame which is substantially closed to the exterior of the speed governor. Frame 12A consists of the front wall 16, the two side walls 18 and 20, and the rear end 22—24. The rear end 22—24 consists of a rectangular bearing block 22. Also included, fillet-welded along the top and the bottom edge, is a circular connecting plate 24 whose annular edge is coextensive or flush with the thereadjoining portion of the outer surface of cylindrical wall 26 and body 14A. The proximal ends of the side walls 18 and 20 are affixed to bearing block 22 and consequently indirectly to connecting plate 24 by means of screws 28. Fillet-welded to wall 26 of body 14A, inside thereof, is the bulkhead frame or plate 30. It is spaced from said annular edge of wall 26 sufficiently to define, together with connecting plate 24, a gearing compartment which houses gearing 32, arranged for r.p.m. increase. Connecting plate 24 is affixed to body 14A by bolts 33 which pass through holes in plate 24 and are screwed into threaded holes in plate 30. Gearing 32, partially shown, will be understood by persons skilled in the art. The gearing compartment is assumed to be adapted to being packed with light grease and sealed off from the general pipeline interior as well as from the rest of the inclusive speed governor by suitable gaskets and shaft packing; because of lack of space neither they nor the various fillet welds are depicted in the views.

An annular member 34, which is the female constituent of the cone brake, is closely fitted inside and affixed to the therewith peripherally coextensive rear end of wall 26 of body 14A by means of plug welds 36. Peripherally aligned and coextensive with member 34 is the mounting plate 38, which is held to member 34 by the screws 40, passed through holes in plate 38 and screwed into holes in member 34. The shouldered cylindrical-tubular fitting 42 is mounted with a press fit into plate 38. Mounted on the neck section of fitting 42 is a double-row ball bearing 44. Inside the shoulder section 42 is a ball bearing 46.

Gearing 32 rotates the segmented drive shaft 48—50, which has four fillet-welded anchor lugs 52 mounted thereon along with two double hinge lugs 54, and the hollow elongated hub 58 of the brake male member 56. The web and annular flange thereof are respectively indicated by 60 and 62. Shaft 48—50 consists in the main of the tubular, relatively long segment 48 and of the relatively short segment 50 which, as can be seen in FIGURE 2b, is spaced from the neck section of fitting 42.

Figures 1, 3:
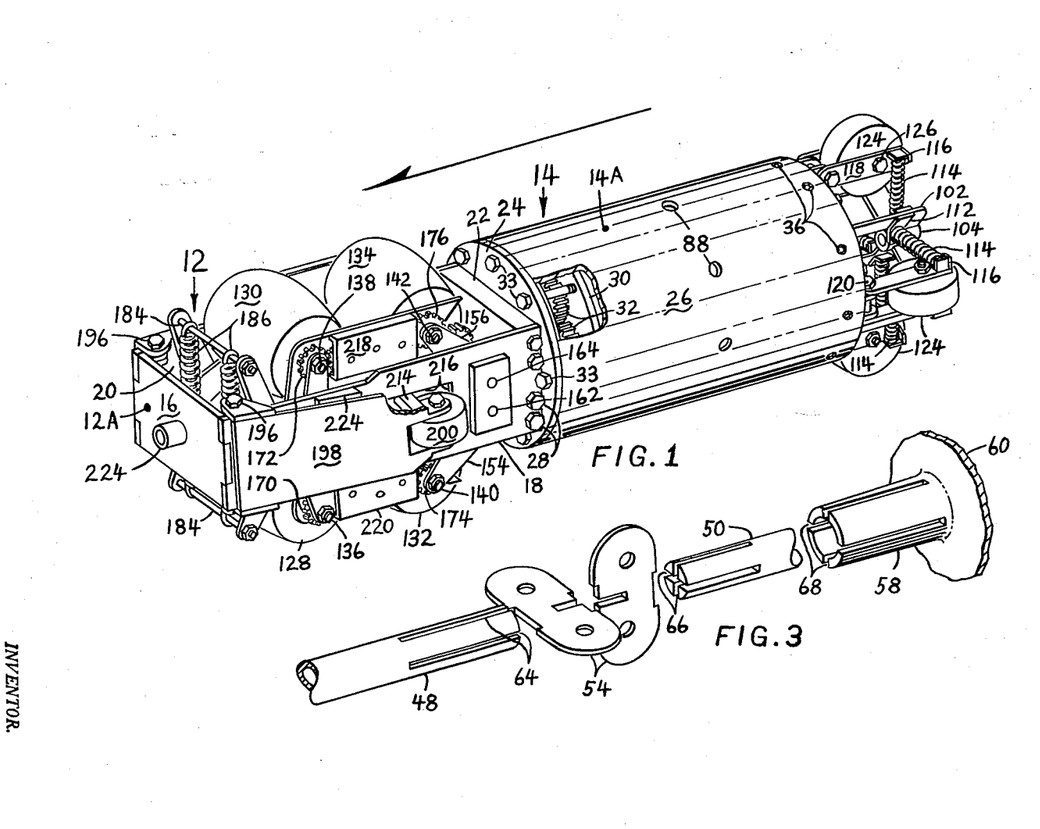
FIGURE 1 is a perspective view of the inclusive said speed governor seen in normal or vertical position, the direction of the translational movement thereof inside the respective pipeline being indicated at top by an arrow.
FIGURE 3 is an exploded view of certain parts embraced by the ellipse 3 in FIGURE 2b.

The inner ends of the segments are each crosswise double-slotted to create four 90-degree-related slots, indicated by 64 and 66 respectively in shaft segments 48 and 50; see FIGURE 3. To assemble, the double hinge lugs are disposed in their eventual positions, whereupon the two shaft segments are fitted to one another with the slot-defining fingers of shaft 50 inside of those of shaft 48, and, of course, with slots 64 in respective transverse alignment with slots 66. The two sets of slots jointly accommodate the therethrough protruding four extensions of the two double hinge lugs. Hub 58 is correspondingly slotted to provide four slots 68 respectively accommodating the therethrough protruding said hinge-lug extensions.

Figure 6:
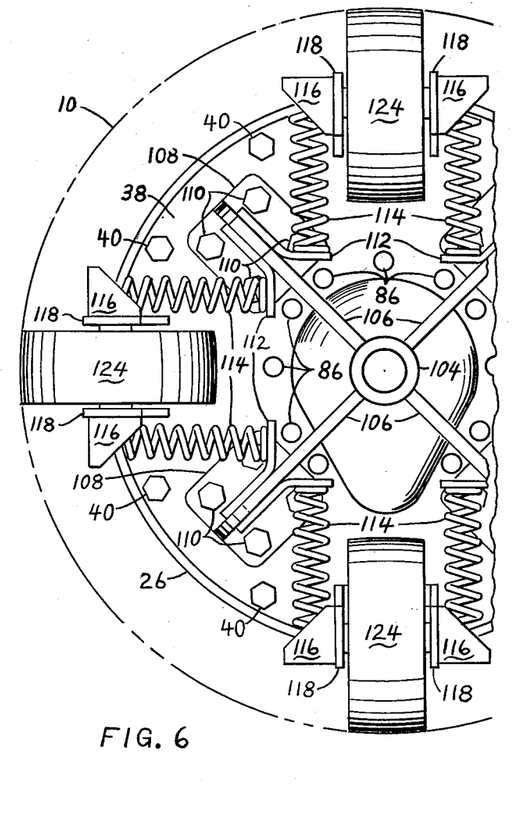
FIGURE 6 is a fragmentary elevation view of the rear end of the weight section.
Figure 7:
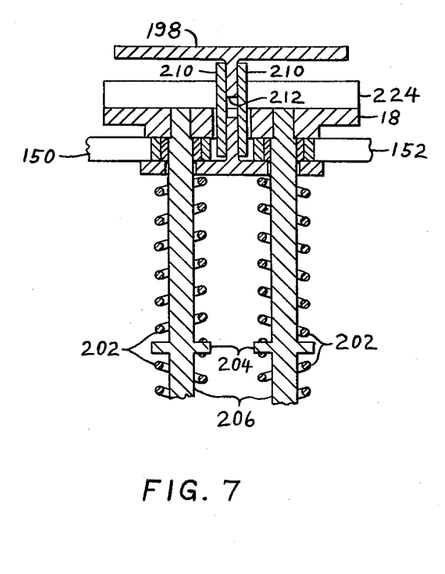
FIGURE 7 is a sectional view taken in the plane 7—7 in FIGURE 4.
Figure 8:
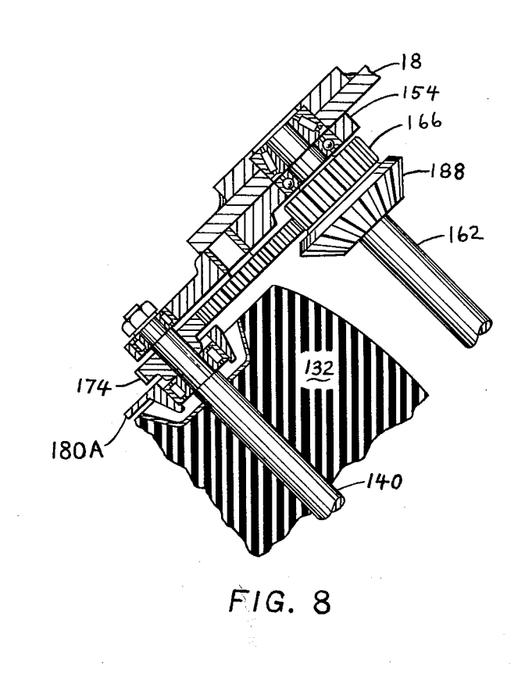

There are four pairs of bell cranks 70. Each of the eight has a long arm and a short arm. The four pairs of long arms respectively mount, by means of screws 72, four centrifugal-force-generating revolving weights 74. Each said pair is hingedly mounted, by means of a screw stud 76, on a respective one of said hinge-lug extensions. Four respective helical tension springs 78 urge the outer ends of the four pairs of short arms toward said four anchor lugs 52, respectively, in consequence of each said spring being hooked into a said outer end and into a corresponding said anchor lug. A respective one of four links 80 connects each pair of short arms (intermediately thereof) and a respective one of four brackets 82 affixed to web 60. To flange 62 of male constituent 56 the brake lining 84 is cemented. The flange-proximal part of web 60 and the female brake constituent 34 are both liberally perforated for the passage therethrough of fan-driven air for the cooling of the brake. Not indicated by reference characters, these perforations are identifiable by the heavy air-current-representing arrows in FIGURE 2b; however, the cooling air inlet and exit ports are respectively indicated by 86 in FIGURE 6 and by 88 in FIGURES 1 and 2b. When the surface of brake lining 84 and that of female constituent 34 are engaged in braking relationship, the two said surfaces are disposed in a common truncated-conical zone.

The rear end of drive shaft 50, mounting the spur gear 90, is journalled in ball bearing 46. The integral fan hub and ring gear 92 is mounted on ball bearing 44 and holds the fan blades 94. Spur gear 90 meshes with pinion gear 96. The pinion shaft to which spur gear 98 is keyed is journalled in the double-row ball bearing 100. Spur gear 98 drives ring gear 92 at an r.p.m. several times that of drive shaft 48—50, let alone that of the wheels.

Rigidly connected with mounting plate 38 is a spider 102, preferably a weldment. It integrates a coupling nipple 104, for coupling any pipeline servicing apparatus thereto, and four arms 106, each arm outer end terminating in a thereto welded pad or foot 108, each foot being affixed to the mounting plate 38 by four screws 110. Each arm 106 mounts a pair of reaction brackets 112 respectively seating, respecting their inner ends, two helical compression springs 114 which, complemented by two other similar springs of which there are eight in all, are seated, respecting the spring outer ends, by brackets 116. They are respectively welded to hinged legs 118, held by respective studs 120 and brackets 122, which are fillet-welded to place 38. Consequently, each roller 124 is mounted on an axle 126. Each pair of springs resiliently urges outwardly, against the inside surface of the respective pipeline, a respective one of the four guiding rollers 124.

Each weight 74 is provided with a thereto cemented buffer and wear-diminishing pad 128, preferably constituted of good brake lining material, for preventing contact with wall 26 on the part of the weights while serving as a stop, preventing excessive outward displacement of the weights.

As shown in FIGURES 1, 2a, 4, 5, 7 and 8, the two fore wheels 128 and 130 and the two aft wheels 132 and 134 should be as large as possible, presenting a maximum of rolling-friction area to the inside surface of the pipeline. The wheels either have deep elastomeric tires or, as adopted herein, each wheel consists of an axle and a massive elastomeric body. Preferably, the tread profile conforms to the curvature of said inside surface in order to preclude premature wear and to augment the braking effect in the mutual engagement of the inside surface of the pipeline and the wheel tread. The axles of the four wheels are respectivly indicated by 136, 138, 140 and 142. To augment the mutual frictional engagement, the elastomeric tread of the tire or wheel can be provided with rectangularly or oblique-angularly transverse ridges or any other configuration designed for resistance against sliding. To each wheel axle end a respective one of eight similar axle spur gears is keyed. To reduce over-all height, three small idler gears, instead of the alternative single large idler gear, operatively intervene between each two longitudinally corrsponding said axle spur gears. By this arrangement all four wheels rotate at the same rate, the fore wheel and the aft wheel in each longitudinal pair rotating isodirectionally and oppositely to the direction of rotation of the two wheels in the other longitudinal pair. Since the two pairs engage opposite surface sections of the pipeline inside surface, all four wheels rotate in agreement for either direction of translational movement of the governor.

Figure 2A:
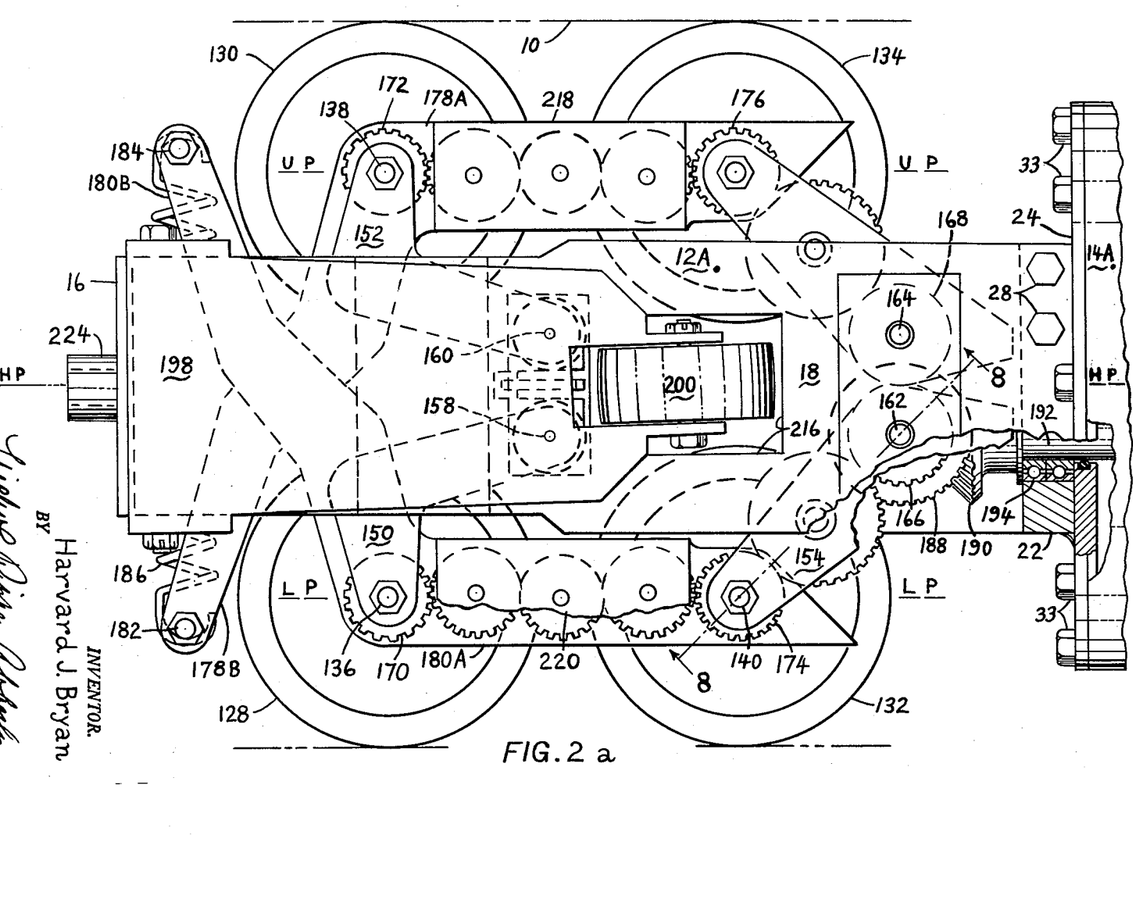
FIGURE 2a is a broken away view, partially in section, which shows the forward portion of the unit of FIGURE 1.
Figure 2B:
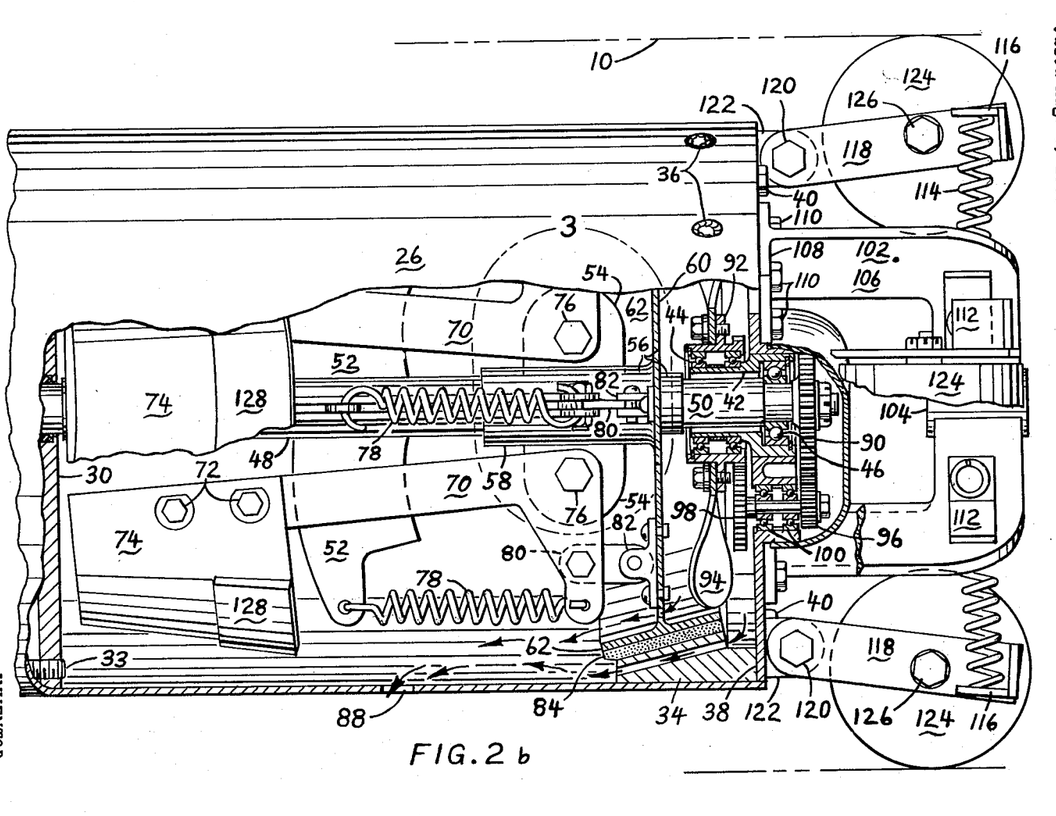
FIGURE 2b is a broken away view, partially in section, showing the trailing or weight section of the unit of FIGURE 1.
Figure 4:
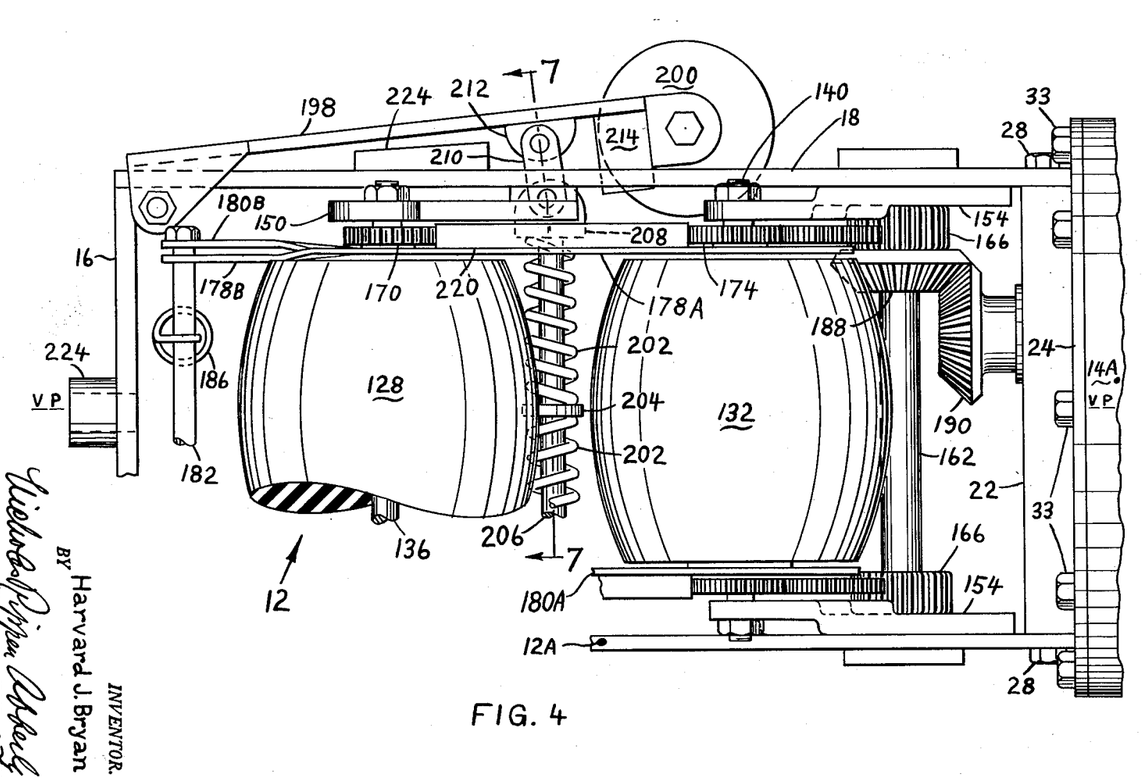
FIGURE 4 is a bottom plan view of the wheel section.
Figure 5:
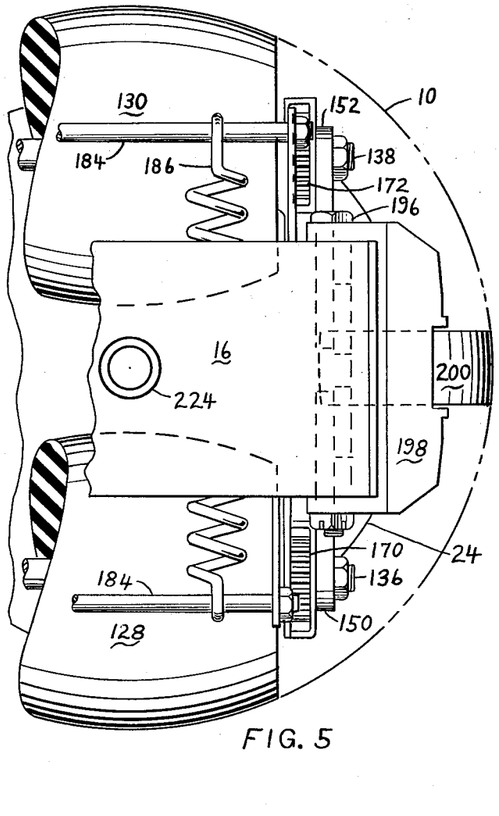
FIGURE 5 is a fragmentary elevation view of the front end of the wheel section.

The axle plane of wheels 130 and 134 and the axle plane of wheels 128 and 132 are respectively indicated by upper plane, UP—UP, and lower plane, LP—LP, in FIGURE 2a. A plane equidistant between planes UP and LP and parallel thereto is indicated by horizontal plane, HP. The thereto rectangular plane that symmetrically intersects the four wheels is indicated by vertical plane, VP. Respectively hingedly holding the axles 136 and 138 are the two pairs of angled links 150 and 152. Respectively hingedly holding the axles 140 and 142 are the two pairs of gear-mounting links 154 and 156. The respective axes of the inner hinged ends of links 150 and 152 are indicated by tiny circles 158 and 160. To the shafts 162 and 164, on which links 154 and 156 are hinged at their inner ends, spur gears 166 and 168 are keyed. Keyed to axles 136, 138, 140 and 142 respectively are the spur gears 170, 172, 174 and 176. Operatively intervening between each gear 166 and each gear 174 and between each gear 168 and each gear 176 is an unidentified, but visible, idler gear in each case. These idler gears, four in all, are all respectively carried on the gear-mounting links 154 (two) and 156 (two). For this reason these links are alternatively referred to as gear links in distinction from the angled links 150 and 152. Between each gear 172 and each gear 176 is a train of unidentified, but visible, three idler gears. Between each gear 170 and each gear 174 is a train of unidentified, but visible, three idler gears.

Each arm in the two pairs of arms 178A—178B and 180A—180B is an integral member consisting of a straight section 178A or 180A and an offset section 178B or 180B. It is apparent that the plane containing the axis 160 and the axle 138, and the plane containing the axles 164 and 142 are parallel and disposed correspondingly obliquely angularly to plane UP. Similarly, the plane containing the axis 158 and the axle 136, and the plane containing the axles 162 and 140 are parallel and disposed correspondingly obliquely angularly to plane LP. These planes therefore define oblique parallelograms, with planes UP and LP always parallel regardless of which selected, always uniform angle is formed by the links with the planes UP and LP. This uniform angle, in the case of the arrangement seen in FIGURE 2a, happens to be one of 45 degrees. Parallelism between arm sections 178A, on the one hand, and arm sections 180A, on the other hand, obtains with every departure on the part of the links from said 45-degree angle.

The offset sections 178B and 180B are mounted, at their ends, on axles 182 and 184 respectively. These axles are resiliently urged toward one another by two thereon hooked, quite heavy helical tension springs 186, with the result that the two pairs of axles 138 and 142, and 136 and 140, tend to move oppositely and therefore force the thereon mounted respective wheels into pressural and therefore frictional engagement with the roof portion and the base portion of the pipeline inside surface respectively.

Mounted on axle 162, in addition to gears 166, is the single bevel gear 188 meshing with bevel gear 190, keyed to and driving the shaft 192 journalled in the double-row ball bearing 194, housed in block 22. Shaft 192, extending into the gearing 32 compartment in section 14 to drive gearing 32, thereby transmits the mechanical energy generated by the section 12 wheels into section 14 and specifically into the segmented shaft 48—50. With increased speed thereof and concomitant outward displacement of the revolving weights 74, the male constituent 56 of the brake engages the female constituent 34, whereupon a reactive force is transmitted back into section 12 and specifically into the four wheels, reducing their speed and generating friction and therefore a braking effect between their treads and the pipeline inside surface.

Hinged by pins 196 are the two torque arms 198 on opposite sides of the governor, each mounting at the opposite end a torque roller 200. The two torque roller pins and, of course, the rollers themselves are askew to planes UP and LP, the askewness in each being opposite that of the other. The two torque-roller-proximal ends of the arms 198, and therefore the rollers as well, are urged in opposite directions by the helical compression springs 202 based on flange 204 on spindle 206. The springs press on lugs 208 and indirectly through links 210 and lugs 212 which are affixed to arms 198.

In explanation of the askewness, assume that an observer is in back of the governor and is facing the same. The torque roller on his left is roller 200; see FIGURES 1, 2a, 4 and 5. It is downwardly askew, which means that it tends to impel counterclockwise twisting of the governor. The other torque roller, which is not visible in the views, is askew upwardly and, since it is on the opposite side, the impulsion it exerts on the governor is also a counterclockwise one. Now assume that, because of having encountered a weld flash or because of centrifugal effect connected with an abrupt righthand twist in the pipeline or perhaps a conflux of these two factors, the governor enters into an incipient counterclockwise twist. Roller 200, finding itself in a lower position and therefore engaging the inside surface more firmly, imposes on the governor a counterclockwise-twisting force reinforcing the incipient counterclockwise twist into which the governor has already entered, with the result that the twist progresses and the governor executes a half revolution, bringing it again into a vertical or normal position but with the wheels 128 and 132 on top and the wheels 130 and 134 on bottom. Assuming now that the governor entered into an incipient clockwise twist instead, the other torque roller, finding itself in a lower position and therefore in an operative state, while roller 200 is temporarily deactivized in its raised position (engaging the inside surface without any firmness at all), assumes the twist-correcting function, but in a manner quite different from that practiced by roller 200 in the first twist mentioned above. The other roller restores the governor to its original position by simply giving it a counterclockwise impulsion. It goes without saying that the askewness of the two torque rollers can, with equal operativeness, be made a clockwise askewness instead of the counterclockwise askewness one sees in the views.

Each reference character 214 indicates an aliner which is a respective one of two plates, each affixed to an arm 198 for confining the path of (quite restricted) oscillation of the respective torque roller to the proximal relief aperture for it 216 in the respective side wall of section 12; see FIGURES 1 and 2a. Gear covers 218 and 220, a set on each governor side, respectively cover three idler gears in each of two sets on the two governor sides, journalled on the two arms 178A and the three idler gears in each of the two sets on the two governor sides, journalled on the two arms 180A. An elastomeric buffer pad 224 is cemented onto each side wall 18 and 20 to preclude abrasion-causing contact between each arm 198 and a respective one of said side walls. A coupling nipple, like nipple 104, is indicated by 224 welded to front wall 16. It provides a means of coupling pipeline servicing apparatus to the governor in advance thereof. Nipples 104, in back of section 14, and nipples 224 can also serve for interconnecting two or three similar governors or for affixment of a towing cable.

Ignoring bevel gears 188 and 190, bevel gear shaft 192 and ball bearing 194, the plane HP is one of vertical symmetry and the plane VP is one of lateral symmetry.

In order to prevent undue wear of the torque rollers, it is desirable that the supporting load be imposed as nearly continuously as possible on either pair of the wheels with their relatively broad tread, and that the torque rollers serve only as occasionally very briefly functioning means for restoring the governor into a normal position every time it departs from it. After use of the governor, it will be found that the two pairs of wheels have undergone approximately equal wear because of the many restorations to a normal position via the 180-degree revolution of the governor. The advantage thereof consists in the fact that the occasions to replace treads will be halved, because each replacement will involve all four wheels, in consequence of which the total down time will be reduced even though more time will be consumed replacing four treads than replacing two treads, which would be the practice should an alternative method of maintaining a vertical position for the governor be adopted. By the foregoing reference is being made to the adoption of wheels in one longitudinal pair weighing much more than the wheels in the other longitudinal pair. In accordance with a further modification of the invention, a single wheel may be nonresiliently mounted, with a considerable part of the governor mass cantilevered in one longitudinal direction, with the remainder of the mass nearly completely cantilevered in the other longitudinal direction. The departure, in the case of the latter, consists in the fact that a moderate amount of support for rollers counteracting tilting and yawing is necessary. In this embodiment gravity becomes the only force exploited for producing the necessary firm pressural engagement of the pipeline inside surface.

Having described the invention in connection with certain specific embodiments thereof, it is to be understood that further modifications may now suggest themselves to those skilled in the art and it is intended to cover such modifications as fall within the scope of the appended claims.

I claim:

1. In a pipeline system wherein a machine travels through the pipeline in response to application of a moving force thereto, the system which comprises rolling means carried by said machine having at least one wheel for engaging the inside cylindrical surface of the pipeline, means for maintaining said wheel in engagement with said surface, a mechanical brake in said machine, and a mechanical linkage coupling said rolling means to said brake including a plurality of weights positionally adjustable within said machine in response to variations in rolling motion of said rolling means for actuating said brake to apply braking forces through said linkage to said surface and by way of said rolling means.

2. In a pipeline system wherein a machine travels through the pipeline in response to application of a moving force thereto, the system which comprises wheel means in said machine for engaging the inside cylindrical surface of the pipeline, means for maintaining said wheel means in contact with said inside surface, a mechanical brake in said machine, and a linkage including a plurality of centrifugal force generating revolving weights coupling said wheel means to said brake for transmission of rotational forces generated by the wheel means while traveling along said pipeline to said brake selectively in dependence upon the positions of said weights.

3. In a pipeline system wherein a machine travels through the pipeline in response to application of a moving force thereto, the system which comprises rolling means in said machine having at least one wheel for engaging the inside cylindrical surface of the pipeline, means for maintaining said wheel in engagement with said inside surface, a mechanical brake in said machine, and a mechanical linkage including a plurality of centrifugal force generating revolving weights coupling said rolling means to said brake for transmitting mechanical forces generated by the rolling means traveling along said pipeline to said brake selectively in dependence upon the positions of said weights.

4. In a pipeline system wherein a machine travels through the pipeline in response to application of a moving force thereto, the system which comprises rolling means carried by said machine including wheels for engaging the inside cylindrical surface of the pipeline at diametrically opposed zones, means for maintaining said wheels in contact with said surface, a mechanical brake in said machine including a rotating element and an element fixed with respect to said machine, and a mechanical linkage coupling said wheels to said brake to move said rotating element into frictional engagement with said fixed element with a force dependent upon the velocity of said machine to apply a braking force to said surface by way of said wheels.

5. Speed control means for a pipeline servicing machine which is propelled through the pipeline in response to a moving force which comprises a first section having wheels for engaging the inside cylindrical surface of the pipeline, a second section coupled to said first section and including a braking mechanism of two elements, the first of which is fixed with respect to the frame of said second section and the second of which is movable into and out of engagement with the first of said elements, and a driving linkage interconnecting said wheels and the second element of said braking mechanism for varying the engagement between the brake elements in dependence upon the velocity of said machine in said pipeline.

6. Speed control means for a pipeline servicing machine which is propelled through the pipeline in response to a moving force which comprises a traction section having wheels for engaging the inside cylindrical surface of the pipeline, a brake section coupled to said traction section and including a braking mechanism of two elements, the first of which is fixed with respect to the frame of said machine and the second of which is movable axially of said machine into and out of engagement with the first of said elements, a linkage interconnecting said wheels and the second element of said braking mechanism for rotation thereof, centrifugal force generating weight means rotatable with said second element and pivotally coupled thereto for varying the engagement between said elements in dependence upon the velocity of said machine in said pipeline to develop velocity dependent braking forces on said wheels, and followers carried by said brake section engaging the walls of said pipeline to oppose rotational forces developed upon production of said braking forces.

7. Speed control means for a pipeline servicing machine which is propelled through the pipeline in response to a moving force which comprises a traction section having wheels engaging the inside cylindrical surface of the pipeline at diametrically opposed zones, a brake section coupled to said traction section and including a braking mechanism having a first element which is fixed in said machine and a second element which is rotatably mounted in said machine and which is translationally movable into and out of engagement with said first element, transmission means interconnecting said wheels and the movable element of said braking mechanism for rotating said second element in dependence upon velocity of said machine, centrifugal force generating weights mounted for rotation with said second element and adapted to vary the force between the brake elements in dependence upon said velocity, and follower wheels carried by said machine engaging the walls of said pipeline to oppose rotational forces developed upon production of said force.

No references cited.